S. W. MATHEWSON.
CULINARY DISHES.

No. 190,688. Patented May 15, 1877.

Witnesses.
Elliot Holbrock
Thomas G. Mathewson

Inventor
Syria W. Mathewson

UNITED STATES PATENT OFFICE.

SYRIA W. MATHEWSON, OF NARRAGANSETT PIER, RHODE ISLAND.

IMPROVEMENT IN CULINARY DISHES.

Specification forming part of Letters Patent No. 190,688, dated May 15, 1877; application filed April 3, 1876.

*To all whom it may concern:*

Be it known that I, SYRIA W. MATHEWSON, of Narragansett Pier, Washington county, Rhode Island, have invented an Improved Heating and Carving Apparatus, of which the following is a specification:

This invention relates to a heating and carving apparatus, and consists in the employment of a suitable earthen or metallic plate, platter, or dish, provided with gravy-sinks, in combination with a wooden removable carving-board resting on said platter, &c.

Figure 1:
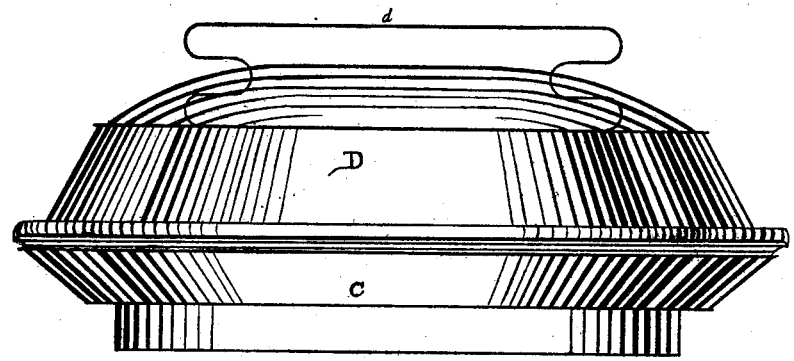
Figure 2:
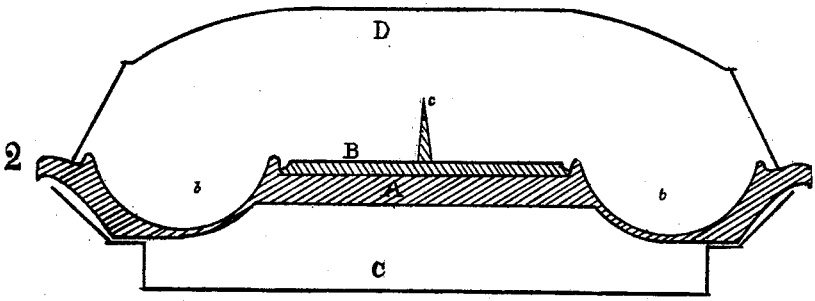
Figure 3:
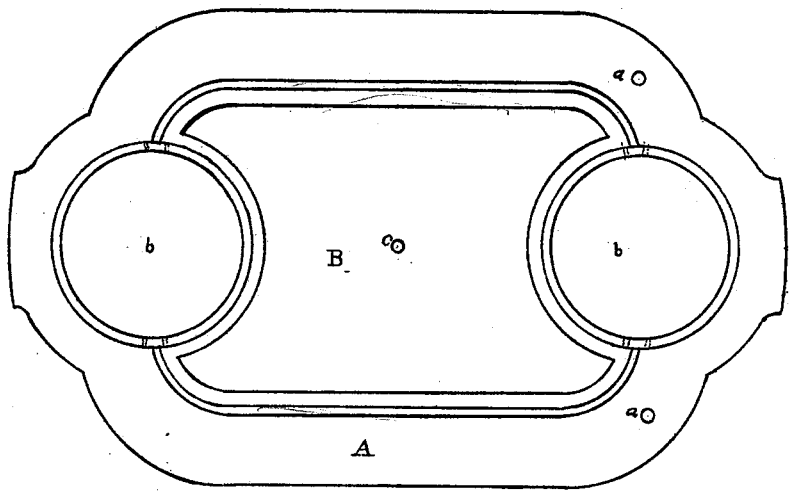

In the drawings, making part of this specification, Figure 1 is a side view of my improved dish covered. Fig. 2 is a vertical section through the same, and Fig. 3 is a plan of the dish and carving-board, with a holding-pin, hereinafter more fully described.

A is the dish, provided at each end with gravy-sinks $b\ b$, to which channels lead, so as to draw off the juices of the meats from the center and edges of the platter. B is the carving-board, preferably made of rock-maple, or of such wood or other material as will not dull the carving-knife nor unpleasantly affect the meats.

The ends of this board embrace the gravy-sinks partially, or it is otherwise so secured in position as not to slide off the platter prematurely. It may, however, be freely removed therefrom when desired, and may, for this purpose, be provided with one or two knobs or handles.

In the center of this board is a sharp metallic vertical pin, C, which enters the piece of meat when it is placed upon the board to be carved, and serves to prevent its displacement. O is a hot-water receptacle or chamber, having a shoulder raised above its base for the bottom of the platter to rest upon.

The water contained in this receptacle, when cold, may be turned off, and the receptacle replenished with hot water again, or it may be kept hot by any other convenient means, and as it comes in immediate contact with the platter the food resting thereon will receive the heat by conduction direct.

Instead of the hot-water receptacle being made separate from the platter, the latter may be made with a bottom, both in one piece, with a water-chamber between, and the water poured out and in by the apertures $a\ a$.

D is the cover, of sufficient dimensions to inclose the meat and to retain the heated air surrounding it. The introduction of a carving-board into an earthen or metallic platter not only materially aids in preserving a cutting-edge upon the knife, but protects the platter from wear and breakage, and in their manufacture the vertical pin C, serving to retain the meat in position, can be erected in the carving-board in a much more practical manner than it could be done in an earthen or metallic platter or dish, and said pin could be more easily and readily replaced in the board if broken off. It is also essential that the board be removable for cleaning both platter and board, and also that means be provided for holding it in proper position when in use; hence the arrangement shown, allowing its ends to partially surround the gravy-sinks. The special advantage of the gravy-sinks to draw off the juices of the meat in a platter, plate, or dish, and in combination with a carving-board, is to be seen in the fact that otherwise the juices of the meats would be, to some extent, absorbed by the board lying therein, and the gravy could not be so readily removed from the dish by a spoon.

Having thus described my improved heating and carving apparatus, what I claim is—

In a culinary dish, the combination of the platter and gravy sink or sinks with the removable carving-board, substantially as and for the purposes described.

SYRIA W. MATHEWSON.

Witnesses:
M. F. PERRY,
S. E. PERRY.